US006050379A

United States Patent [19]

Lyon

[11] Patent Number: 6,050,379

[45] Date of Patent: Apr. 18, 2000

[54] ALGORITHM FOR ELECTRO-MECHANICAL CLUTCH ACTUATOR

[75] Inventor: Kim M. Lyon, Bloomfield Hills, Mich.

[73] Assignee: Chrysler Corporation, Auburn Hills, Mich.

[21] Appl. No.: 09/113,543

[22] Filed: Jul. 10, 1998

[51] Int. Cl.[7] .......... F16D 43/22

[52] U.S. Cl. .......... 192/54.1; 192/90; 701/68

[58] Field of Search .......... 477/176, 180, 477/74; 701/68; 192/54.1, 54.4, 90

[56] References Cited

U.S. PATENT DOCUMENTS

| | | | |
|---|---|---|---|
| 4,424,890 | 1/1984 | Duethman . | |
| 4,722,429 | 2/1988 | Kono | 477/180 X |
| 5,056,639 | 10/1991 | Petzold et al. | 477/176 |
| 5,322,150 | 6/1994 | Schmidt-Brucken et al. | 477/176 |
| 5,335,174 | 8/1994 | Kohno et al. | 701/68 |
| 5,337,868 | 8/1994 | Liu et al. | 477/74 |
| 5,337,874 | 8/1994 | Oltean et al. | 192/111 A |
| 5,393,274 | 2/1995 | Smedley | 477/74 |
| 5,624,350 | 4/1997 | Bates | 477/176 X |
| 5,630,773 | 5/1997 | Slicker et al. | 477/176 |
| 5,871,419 | 2/1999 | Amendt | 477/180 |

FOREIGN PATENT DOCUMENTS

WO 95/02857 1/1995 WIPO .

OTHER PUBLICATIONS

Motion Systems Corporation, "Ball Drive 85010/85039/85206 Epicyclic Ball Screws".

Maurey Instrument Corp., "Conductive Plastic Slide Potentiometer", Type P2333 Slide Pot.

*Primary Examiner*—Rodney H. Bonck

*Attorney, Agent, or Firm*—Jennifer M. Stec

[57] ABSTRACT

In providing automated shifting of a manual transmission, the electro-mechanical clutch actuator of the present invention is provided for disengaging and engaging the clutch of a manual-type transmission. The control algorithm includes utilizing an adaptively learned touchpoint along with a series of calibrated offsets for positioning the clutch during different modes of operation. During engagement of the clutch, a closed-loop, PID, "rate of clutch slip" calculational scheme controls the rate of clutch engagement to a predetermined numeric rate of clutch slip.

1 Claim, 11 Drawing Sheets

16
18
134
20
22

24
12
46
148

145

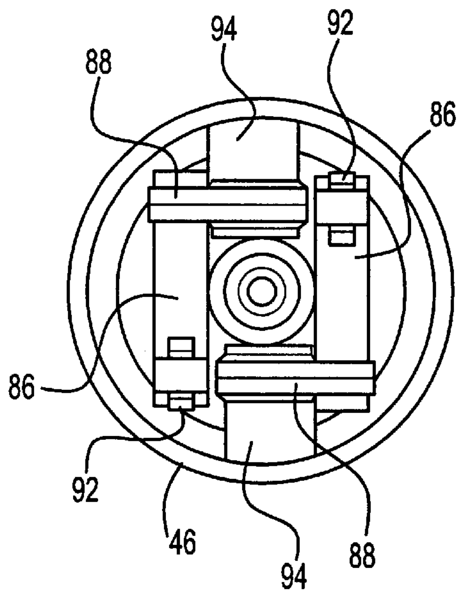
Fig-6
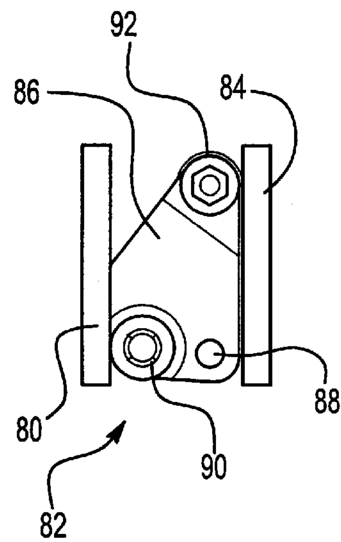
Fig-7
Fig-8A
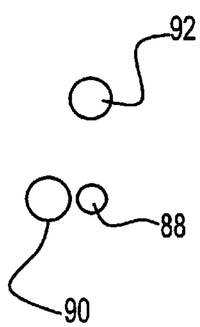
Fig-8B
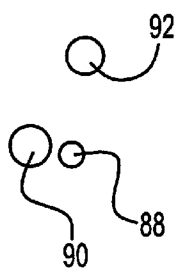
Fig-8C
92
88
90
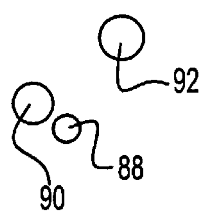
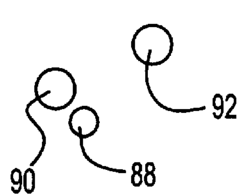
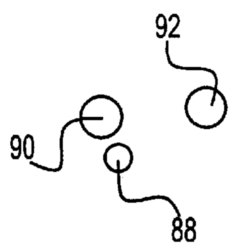
Fig-8D
Fig-8E
Fig-8F 52
28
44
42
48
32
34
54
50

56
58
60
52
28
46
44
32
48
34
50
54

56
58
60

- POSITION CLUTCH FOR PARKING LOT MANEUVER/ LAUNCH

- POSITION CLUTCH FOR PARKING LOT MANEUVER/ LAUNCH

- POSITION CLUTCH FOR PARKING LOT MANEUVER/ LAUNCH

- EXECUTE PID CONTROLLED RATE OF CLUTCH SLIP ROUTINE TO RE-ENGAGE CLUTCH

- EXECUTE 3-PART CLUTCH POSITIONING ROUTINE

- POSITION CLUTCH AT KICKDOWN POSITION

ALGORITHM FOR ELECTRO-MECHANICAL CLUTCH ACTUATOR

BACKGROUND OF THE INVENTION

1. Field of the Invention

The present invention relates to an electro-mechanical clutch actuator, and more particularly, to an algorithm for an electro-mechanical clutch actuator for automated shifting of a manual transmission.

2. Background and Summary of the Invention

Both manual and automatic-shift transmissions are well known in the automotive industry. Manual transmissions typically include a shift lever which is manually operated by a vehicle operator to shift the manual transmission between the various gear ratios which are provided. In such a system, the shift lever is connected with a linkage system which is utilized to selectively engage a selected gear of an input shaft/counter-shaft manual transmission system. During the disengagement of one gear ratio and the subsequent engagement of another gear ratio, a clutch is typically disengaged in order to release the transmission input shaft from driving engagement with the engine output shaft. This clutch is typically disengaged by a clutch cable or rod which is connected to a foot pedal which is depressed by the vehicle operator prior to shifting gears and subsequently released upon completion of a gear shift operation.

During the operation of a vehicle having a manual transmission, a vehicle operator can become accustomed to the rate at which the clutch pedal can be depressed and released for disengaging and reengaging the clutch for smooth operation of the vehicle during shifting operations.

As a clutch disk wears down over its useful life, the clutch pedal position at which the clutch disk/clutch cover assembly begins to transmit significant torque changes with respect to the driver's position within the vehicle. In addition, the clutch cover/clutch disk assembly may exhibit different rates of clutch apply for the same rate of clutch pedal motion by the driver dependent upon the geometry of the linkage that connects the clutch pedal to the clutch disk/cover assembly. Also, the clutch cable or rod often needs to be manually adjusted as the clutch disk wears down in order to provide proper disengagement and reengagement of the clutch.

Manual transmissions are widely considered to be more efficient than automatic transmissions since automatic transmissions have large parasitic losses associated with the pressurized hydraulic fluid systems which must be maintained for pressurizing the torque converter and hydraulically engaging and disengaging each of the clutch packs and brake assemblies which are typically associated with an automatic transmission. However, despite the relative inefficiency of an automatic transmission relative to a manual transmission, the simplicity and convenience of driving a vehicle having an automatic transmission is still preferred by a large portion of the automobile consumers.

Accordingly, the present invention is directed toward providing automated shifting of a manual transmission in order to provide a vehicle with a transmission which has the simplicity and convenience of an automatically shifted transmission but which does not have the parasitic losses associated with a standard automatic transmission, in particular, those associated with a torque converter and a hydraulic actuator system.

In providing automated shifting of a manual transmission, the electro-mechanical clutch actuator of the present invention is provided for disengaging and engaging the clutch of a manual-type transmission. The electro-mechanical clutch actuator is provided with an assist spring/cam assembly which is designed to reduce the load on the electric motor such that the load-compensating assist spring counteracts the clutch cover spring leaving only the frictional and inertial forces of clutch cover motion to be supplied by the electric motor. Additionally, the load-compensating assist spring allows the shift (including clutch release and engagement) to be made faster and with a reduced-size motor. The clutch actuator also includes a mechanical wear adjuster which automatically adjusts the position of the release linkage as a clutch disk wears over its useful life.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 6 is a cross-sectional view taken along line 6—6 of FIG. 1, illustrating the assist cam assembly according to the principles of the present invention;

FIG. 7 is a side view of an assist lever of the assist spring/cam assembly according to the principles of the present invention;

FIGS. 8*a*–8*f* illustrate the relative position of the assist lever of the assist spring/cam assembly during various ranges of travel during actuation of the clutch actuator;

DETAILED DESCRIPTION OF THE PREFERRED EMBODIMENTS

Figure 1:
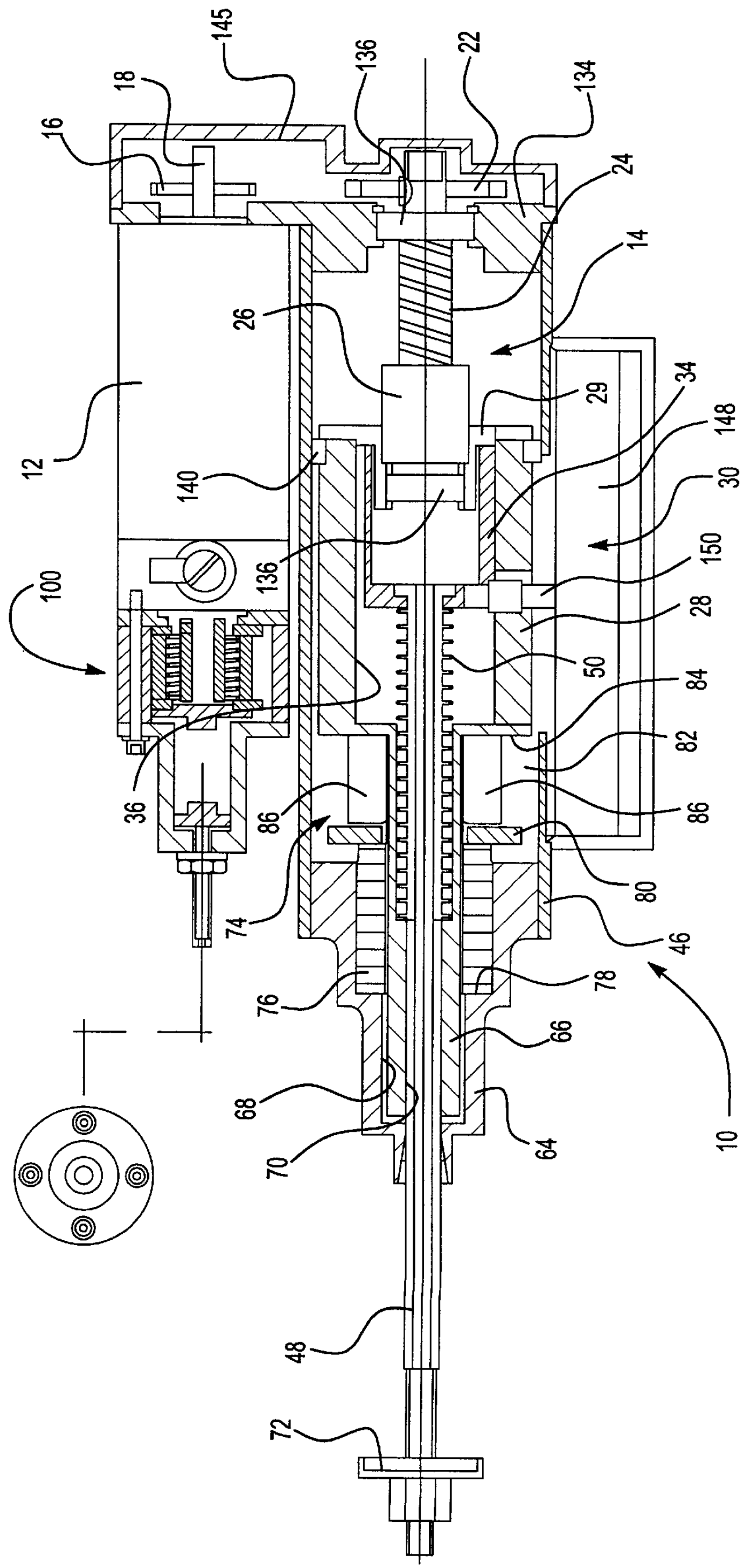
FIG. 1 is cross-sectional view of an electro-mechanical clutch actuator according to the principles of the present invention.

With reference to the accompanying drawings, the electro-mechanical clutch actuator 10 according to the present invention will be described. The clutch actuator 10 includes an electric motor 12 which provides a rotary drive member which is drivingly engaged with a ball screw assembly 14 via a drive gear 16 mounted on a drive shaft 18 of the electric motor 12. An idler gear 20 is driven by the drive gear 16. Idler gear 20 drives a driven gear 22 which is mounted to a ball screw shaft 24 of ball screw assembly 14. A ball screw nut 26 is disposed on the ball screw shaft 24.

Figure 2:
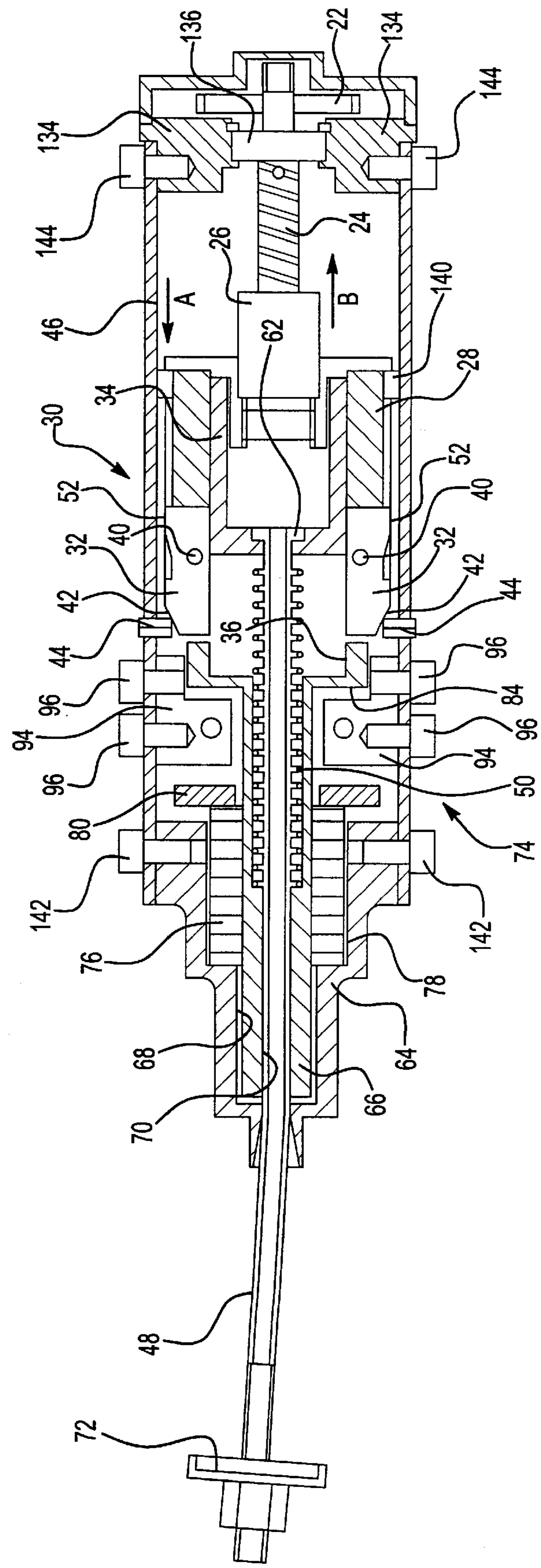
FIG. 2 is a cross-sectional view taken along line 2—2 of FIG. 5 of the electro-mechanical clutch actuator according to the principles of the present invention.
Figures 3, 4, 5:
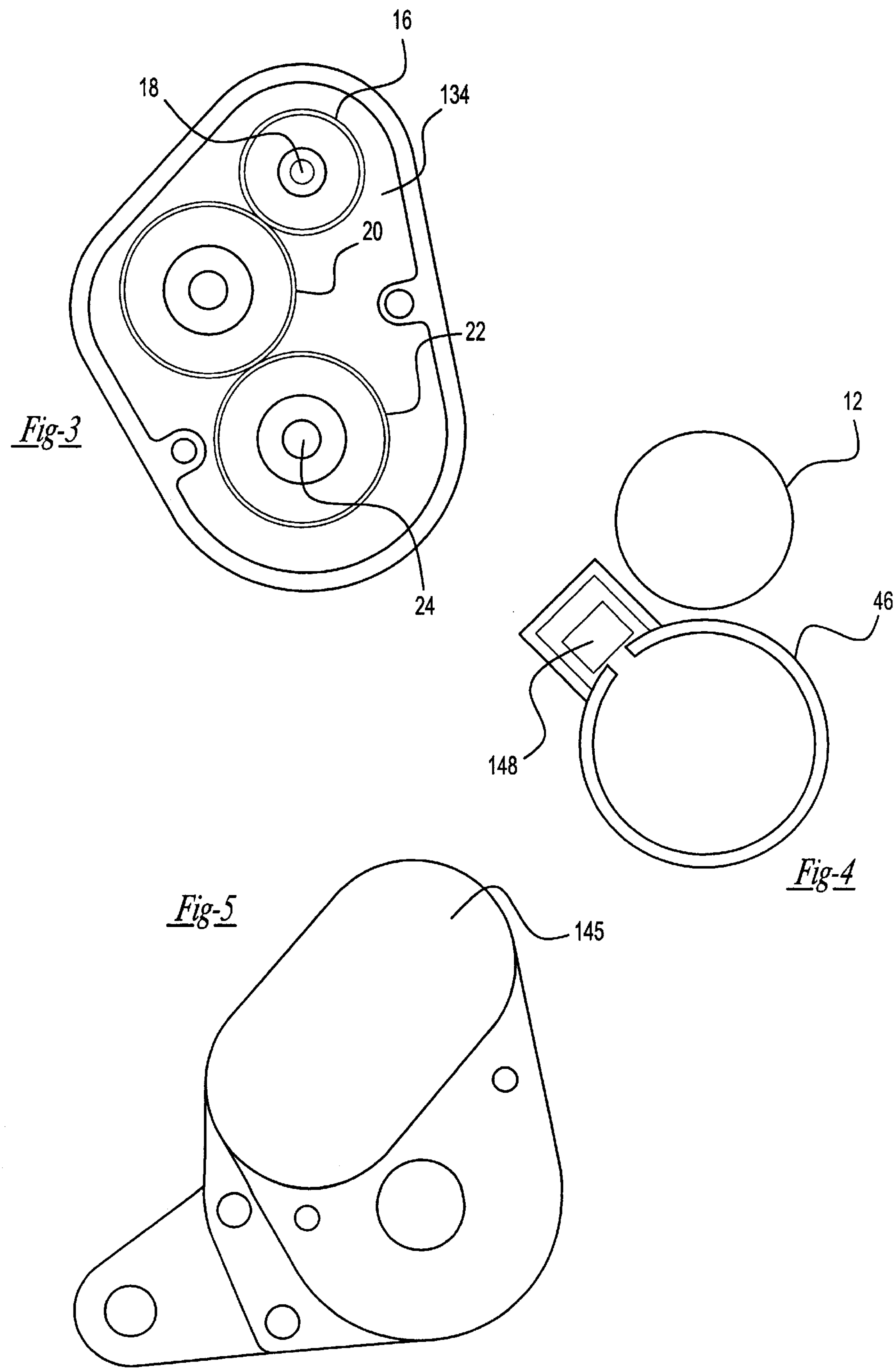
FIG. 3 is an end view of the electro-mechanical clutch actuator according to the present invention with the gear train housing removed.
FIG. 4 is a schematic diagram illustrating the relative positioning of the actuator housing, the electric motor and the linear potentiometer.
FIG. 5 is an end view of the gear train cover.
Figures 9A, 9B:
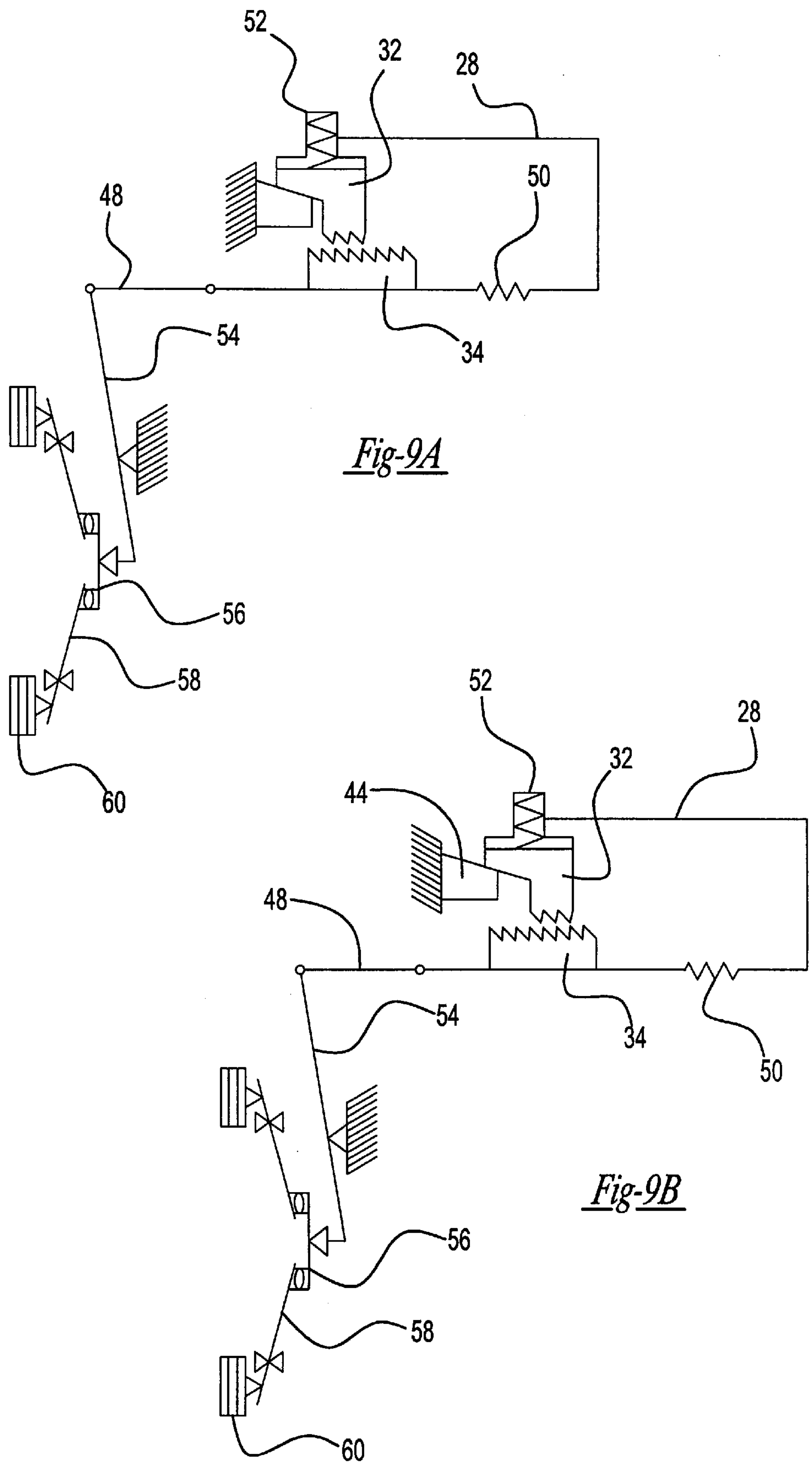
FIGS. 9*a*–9*d* schematically illustrate the operation of the wear compensator according to the principles of the present invention.
Figures 9C, 9D:
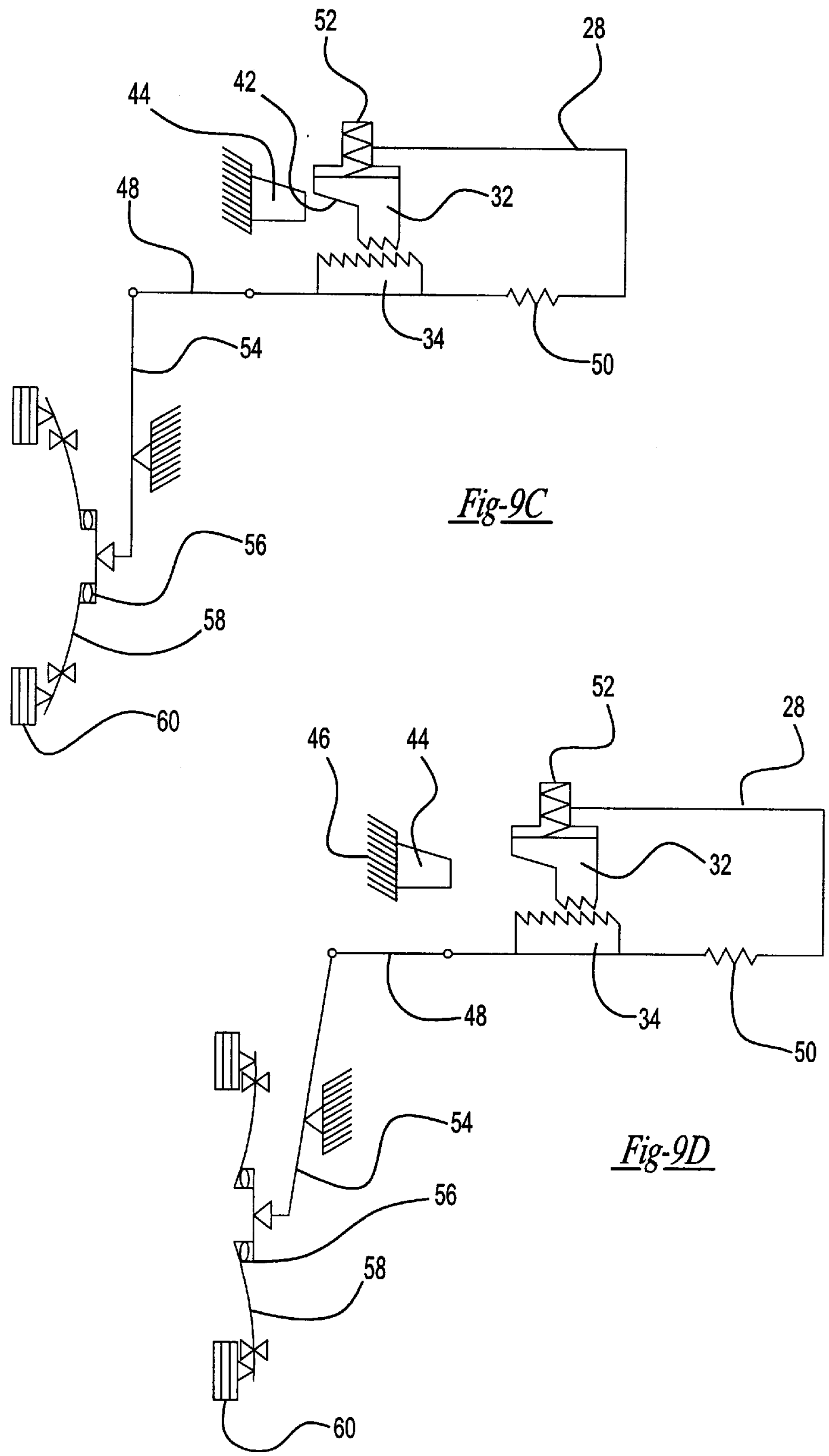

A self-adjuster housing 28 is attached to the ball screw nut 26 via an adapter plate 29. The self-adjuster housing 28 serves as a first member of a wear compensator assembly 30. The self-adjuster housing 28 supports a pair of pivot pawls 32 (as seen in FIG. 2) which serve as an engagement mechanism for engaging the self-adjuster housing 28 with a rack 34 having a toothed surface thereon. Rack 34 serves as a second member of the wear adjustment assembly 30. Rack 34 is formed as a generally cylindrical cup-shaped member which is received in a central opening portion 36 of self-adjuster housing 28. Pivot pawls 32 are pivotally mounted to the self-adjuster housing 28 by pivot pins 40. Pivot pawls 32 each include a ramp portion 42 which is engagable with a pair of adjustment retractor members 44 which extend radially inward from an actuator housing 46.

As the self-adjuster housing 28 is moved in the direction of arrow "A" toward the left-most position, as shown in FIGS. 1 and 2, thereby providing slack in the clutch cable 48, the ramp portion 42 of pivot pawls 32 engage the adjuster retractor members 44 causing pivot pawls 32 to pivot about pivot pins 40 and thereby disengage the rack 34. At this time, a preload spring 50 which is disposed between the self-adjuster housing 28 and rack 34 is allowed to extend generally to its relaxed position, thereby pressing the rack 34 relative to the self-adjuster housing 28 and thereby taking out any slack in the clutch cable 48. Accordingly, the wear compensator assembly 30 automatically adjusts the position of the release linkage in order to maintain the same clamp load as the clutch disk wears down over its useful life.

As the electric motor 12 is operated to drive the ball screw assembly 14 and thereby the self-adjuster housing 28 in the direction of arrow B, the ramp portion 42 of locking pawls 32 disengage from the adjustment retractor members 44 and are biased by leaf springs 52 back into engagement with rack 34.

The clutch cable 48 of the present invention is designed to be attached to a clutch disengagement linkage system. For example, FIGS. 9*a*–9*d* illustrate a typical clutch linkage system including a release lever 54 which is pivotally mounted to a transmission case. The release lever 54 is attached to a constant contact release bearing 56 which engages a diaphragm spring 58. The diaphragm spring 58 normally biases a clutch disk 60 into an engaged position.

In order to disengage the clutch disk 60, the electric motor 12 is driven and causes rotation of drive gear 16 which in turn drives the idler gear 20 and driven gear 22. Driven gear 22 causes rotation of the ball screw shaft 24 of ball screw assembly 14. Rotation of the ball screw shaft 24 causes axial movement of the ball screw nut 26 in the direction of arrow B. Movement of the ball screw nut 26 causes the self-adjuster housing 28 to move therewith. The self-adjuster housing 28, via engagement with the locking pawls 32, causes the rack 34 to move therewith along with the clutch cable 48. The clutch cable 48, which is attached to release lever 54, causes disengagement of the clutch disk 60.

As a clutch disk 60 wears down over its useful life, the position of the release linkage must be adjusted to maintain the same clamp load. Adjustment is also important because the assist spring force curve should preferably match the clutch cover during the entire wear cycle. Accordingly, the clutch actuator 10 of the present invention is provided with an automatic wear adjustment feature whereby the self-adjuster housing is driven in the direction of arrow A to a predetermined position whereby the ramp portion 42 of locking pawls 32 engage the adjustment retractor members 44 then cause the pivot pawls 32 to pivot about pivot pins 42 and disengage from rack 34. At this point, the pre-load spring 50 presses against the rack 34, so that rack 34 may be moved relative to the self-adjustor housing 28 in the instance that clutch disk wear is sufficient enough to require adjustment. In order to reengage the locking pawls 32 with the rack 34, the electric motor 12 is driven in order to drive the ball screw nut 26 in the direction of arrow B which causes the self-adjuster housing 28 to move therewith thereby causing the locking pawls 32 to disengage from the adjustment retractor members 44. At this time, the leaf springs 52 bias the locking pawls 32 back into engagement with the rack 34, and the actuator is automatically adjusted to compensate for wear of the clutch disk.

The clutch cable 48 is provided with an end fitting 62 which is received through an opening in rack 34. The clutch cable 48 extends through an end piece 64 of actuator housing 46. The self-adjuster housing 28 is provided with an axially extending guide portion 66 which is received within a central bore 68 in the end piece 64. The clutch cable 48 extends through a central opening 70 in the axially extending guide portion 66 of the self-adjuster housing 28. The clutch cable 48 is provided with an end fitting 72 which is connectable with the clutch release lever system described above.

An assist spring/cam assembly 74 is provided between the end piece 64 of the actuator housing 46 and the self-adjuster housing 28. The assist spring/cam assembly 74 includes an assist spring 76 in the form of a coil spring which is seated against a spring seat portion 78 of the end piece 64. A second end of the assist spring 76 is disposed against an assist washer 80 which is movably supported along the axially extending portion 66 of the self-adjuster housing 28. A pair of assist cams 82 are disposed between assist washer 80 and a radially extending wall portion 84 of self adjuster housing 28.

Figure 10:
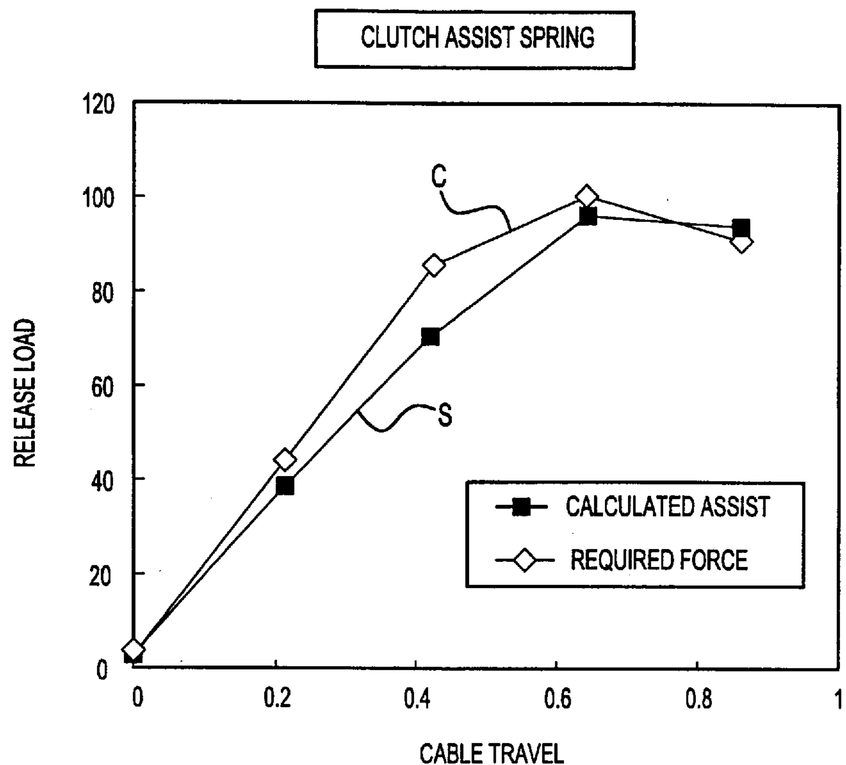
FIG. 10 is a graph illustrating the amount of release load force required for disengaging a clutch as well as the calculated amount of release load assistance provided by the assist spring/cam assembly during various intervals of cable travel.

With reference to FIGS. 6 and 7, assist cams 82 each include an assist lever 86 pivotally attached to the actuator housing 46 by a pivot pin 88 and including a first roller 90 disposed against the assist washer 80 and a second roller 92 disposed against the radially extending wall portion 84 of self-adjuster housing 28. The pivot pins 88 of the assist cam assembly 82 are supported by retainer members 94 which are attached to the actuator housing 46 via fasteners 96, as shown in FIGS. 2 and 6. As the clutch actuator 10 is operated for disengaging the clutch, the assist spring/cam assembly 74 helps to reduce the load on the electric motor. With reference to FIGS. 7 and 8*a*–8*f*, the operation of the assist spring assembly will now be described. During normal engagement of the clutch disk 60, the clutch actuator 10 is in a home position. In this state, the assist spring 76 presses against the assist washer 80 which presses against the assist levers 86 by acting on rollers 90. In this position, a very short moment arm "x" exists between the center of the pivot pin 88 and the center of the roller 90, while a maximum moment arm distance "y" is provided between the center of the pivot pin 88 and the center of roller 92. During actuation of the clutch actuator 10, movement of the self-adjustor housing 28 in the direction of arrow B allows the assist lever 86 to rotate about the pivot pin 88 causing an increase in the moment arm "x" and a corresponding decrease in the moment arm "y" during each increment of travel of the self-adjustor housing 28. FIGS. 8*a*–8*f* illustrate the changes in the moment arm dimensions at 20% travel intervals during rotation of the assist lever 86. FIG. 10 illustrates the amount of release load assist which is provided by the assist spring/cam assembly 74 in comparison with the amount of release load required for disengaging the clutch disk 60. As can be readily understood by one of ordinary skill in the art, as the length of the moment arms "x" and "y" between each of the rollers 90, 92, respectively, and the pivot pin 88 increase and decrease, respectively, during rotation of the assist levers 86, the amount of release load assist that can be generated by the assist spring/cam assembly 74 also increases. This allows the spring assist force curve "s" to closely match the clutch load curve "c".

Figure 11:
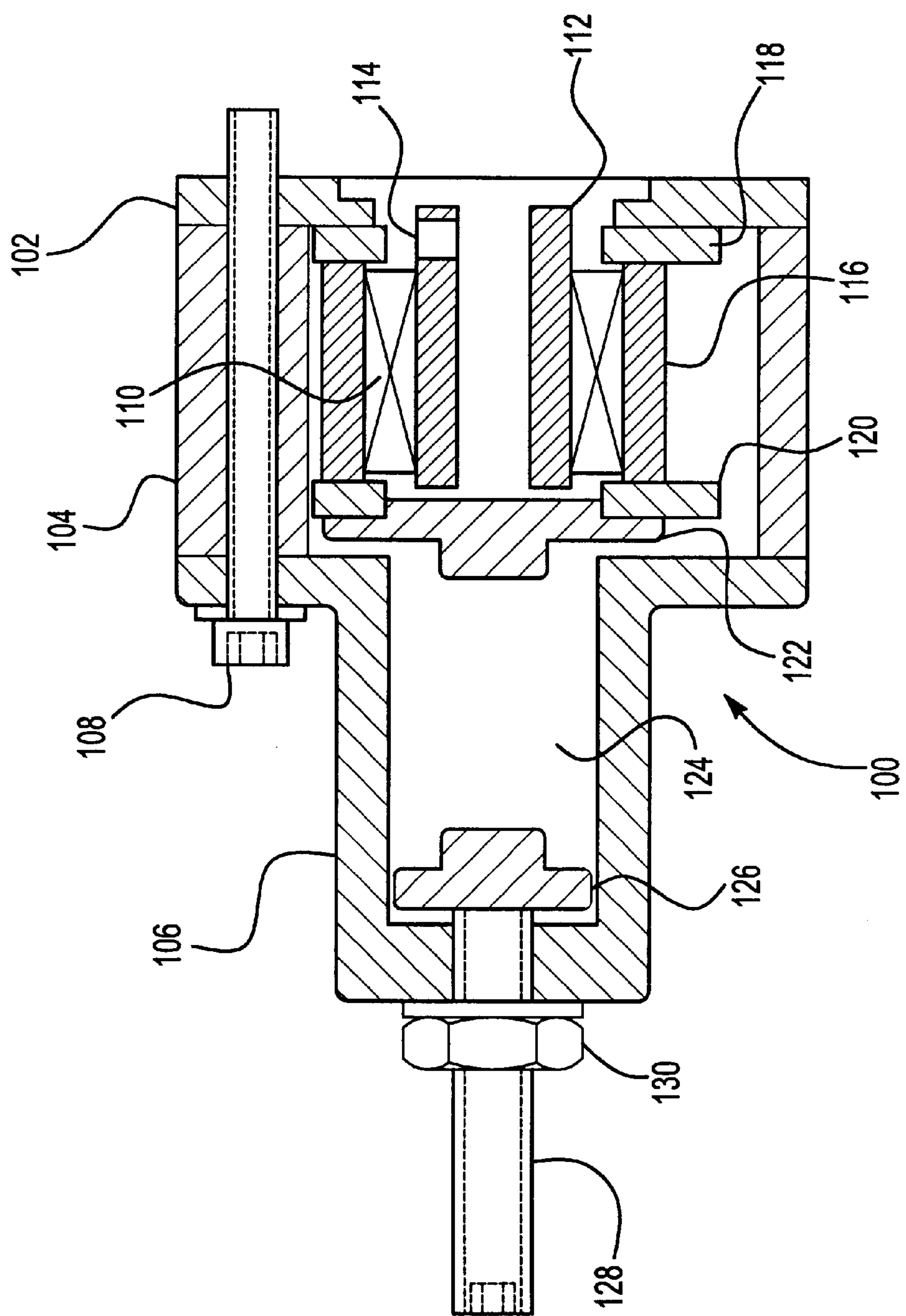
FIG. 11 is a detailed cross-sectional view of the one-way friction clutch utilized in the system of the present invention.

Due to the low friction on the actuator system and the possible mismatch of the assist spring load to the clutch load, there is a possibility for the clutch actuator unit to back drive when the actuator is stopped during mid-stroke. To eliminate this possibility, a one-way friction device 100 is attached to the motor drive shaft 18. With reference to FIG. 11, the one-way friction device 100 is shown. The one-way friction device 100 includes a housing base plate 102 which is attached to the electric motor 12. A friction brake housing 104 is mounted to the housing base plate 102 and a spring housing 106 is attached to the friction brake housing 104 via a set screw 108. A roller clutch 110 is disposed within the friction brake housing 104. Roller clutch 110 includes a roller clutch shaft 112 which is attached to the motor drive shaft 18 via a set screw which is inserted through the socket head 114. Anti-friction bushing 116 is disposed circumferentially around the roller clutch 110 and is sandwiched between first and second friction plates 118,120. Friction plate 118 is disposed between the friction bushing 116 and the housing base plate 102. Friction plate 120 is disposed between the friction bushing 116 and a spring bottom seat member 122. The spring bottom seat member 122 is biased by a compression spring 124 which is seated against the spring bottom seat member 122 and a spring top seat member 126. The spring top seat 126 is attached to a set screw 128 which is received through an opening in the spring housing 106. A jam nut 130 is provided on the set screw 128 to adjustably support the set screw 128 in an axial position relative to the spring housing 106. By adjustment of the jam nut 130, the spring top seat 126 can be moved in an axial direction to increase or decrease the amount of compression force on compression spring 124 and can thereby alter the friction resistance provided by the one-way friction device 100.

The electric motor 12 is attached to the actuator housing 46 by a motor mounting plate 134. An end portion of the ball screw shaft 24 is supported by the motor mounting plate 134 by a bearing assembly 136. A second end portion of the ball screw shaft 24 is supported via a bearing assembly 138 which is secured within adapter plate 29. The self-adjuster housing 28 is slidably supported within the actuator housing 46 by an actuator bearing 140. The end piece 64 is mounted to the actuator housing 46 by threaded fasteners 142, as shown in FIG. 2. The actuator housing 46 is also attached to the motor mounting plate 134 by fasteners 144. A gear train housing 145 is attached to the motor mounting plate 134 for covering the drive gear 16, the idler gear 20, and the driven gear 22.

A linear potentiometer 148 is provided to measure the travel of the actuator and to provide feedback control information to the controlling computer. The potentiometer 148 is mounted on the actuator housing 46 and measures the position of the clutch linkage via position of the clutch actuating cable. A linear potentiometer 148 as used in accordance with the present invention is available from Maurey Instrument Corp., Chicago, Ill. 60629. Since the potentiometer drive pawl 150 is connected downstream of the wear compensator 30, the wear of the clutch 60 can be measured. This will allow the control computer to adjust for changing performance as the clutch 60 wears and will also allow for the computer to determine when the clutch 60 is worn out.

The ball screw assembly 14 has an overrunning feature at each end of its stroke. The overrunning feature allows the ball screw assembly 14 to be operated to drive the ball screw nut 26 to the end of its stroke in order to zero-in the potentiometer travel. The motor is run against its stop for a short duration to ensure that the wear adjustment is complete and then the potentiometer reading is taken. This is used for the starting point for the release travel. The ball screw assembly having an overrunning feature is available from Motion Systems Corporation, Eaton Town, N.J. 07724. With conventional ball screw assemblies which do not have the overrunning feature, the ability to drive the ball screw nut 26 to the end of the shaft 24 is limited due to the fact that if the ball screw nut 26 is driven too tightly against the end, a lock-up may occur. Therefore, with the overrunning feature, any lock-up associated with a standard ball screw assembly can be avoided, and a zeroing-in of the potentiometer travel can be properly achieved.

Figure 12:
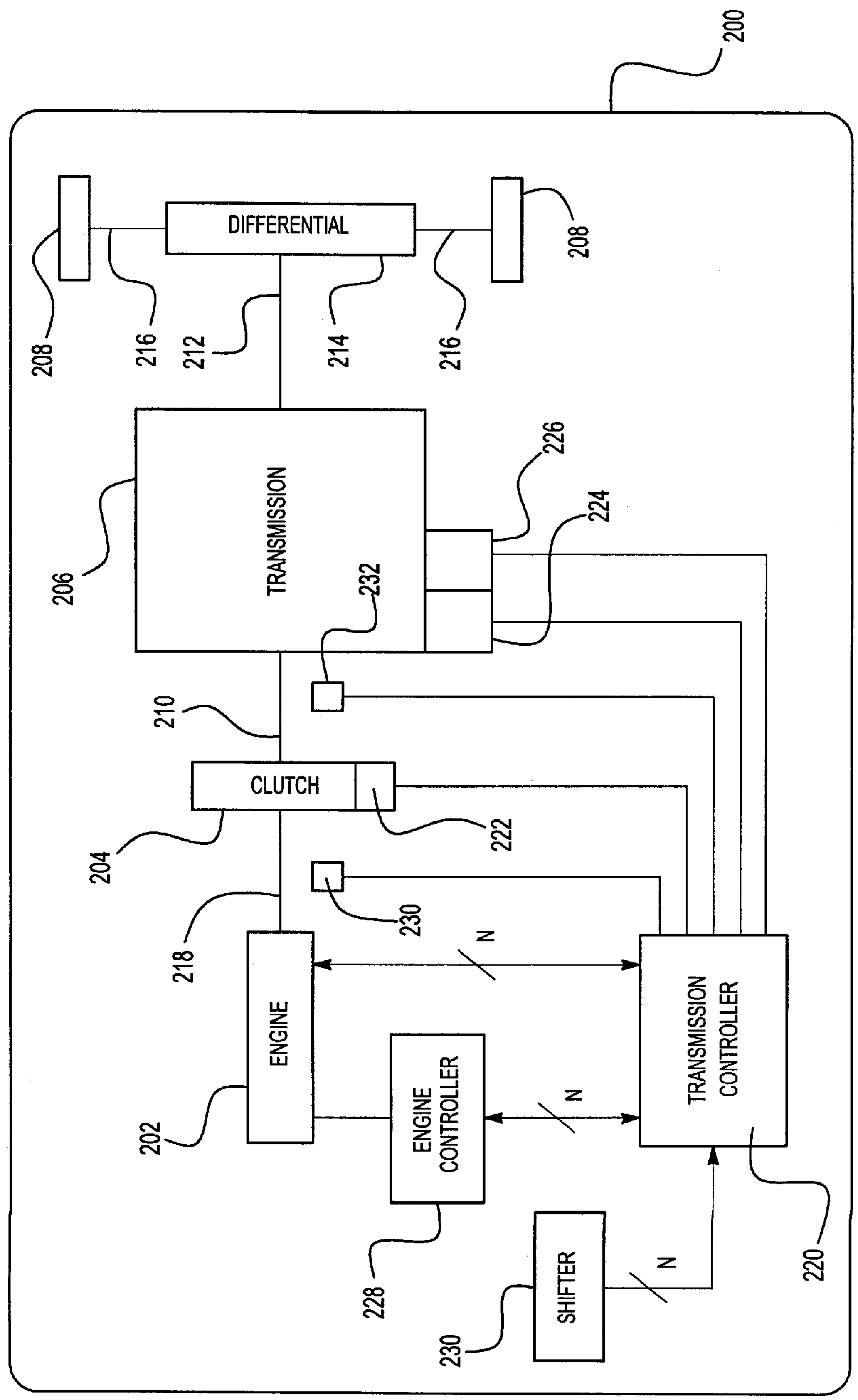
FIG. 12 is a schematic diagram of a powertrain system according to the principles of the present invention.

With reference to FIG. 12, a powertrain system 200 arranged according to the present invention is illustrated for a motor vehicle. The powertrain system 200 includes a heat engine 202 operating on a hydrocarbon base or fossil fuel. The powertrain system 200 includes a clutch mechanism 204, as is known in the art, for operably interconnecting engine 202 and transmission 206. The clutch mechanism 204 compensates for the difference in rotational speed of engine 202 and transmission 206, to smooth engagement between engine 202 and transmission 206.

Transmission 206 connects to engine 202 through clutch 204 and transmits engine rotation and power at various ratios to drive wheels 208 of the motor vehicle. Thus, transmission 206 enables the motor vehicle to accelerate through predetermined gear ratios, while engine 202 functions within a predetermined operating range to drive transmission 206. Examples of known transmission types include an automatic transmission, a manual transmission, or a continuously variable transmission. It should be appreciated that a preferred embodiment transmission 206 is generally a conventional four, five, or six-speed manual-type transmission as is well known in the art having modifications as described herein.

Transmission 206 includes a driving or input shaft 210 operatively connected to clutch 204. As is known for conventional manual-type transmissions, input shaft 210 supports a plurality of gears which selectively mesh for engagement with a plurality of gears supported on a counter or output shaft generally shown at 212. Output shaft 212 includes an output gear which meshingly engages with a ring gear of differential 214. Differential 214 engages a pair of drive shafts 216, which are operatively connected to drive wheels 208, and provides power to drive wheels 208. The operation of a differential is well known to those skilled in the art and will not be described herein. The operation of engine 202 produces a torque output which causes an engine output shaft 218 and transmission input shaft 210 to rotate at a first rate (while clutch 204 is engaged). Concurrently, output shaft 212 rotates at a second rate related to the rate of rotation of input shaft 210 in accordance with a particular gear setting engaged between the respective shafts 210, 212. Similarly, output shaft 212 drives the differential 214 to cause rotation of drive shafts 216 and drive wheels 208.

Before a shift between gears of transmission 206 can occur, it is necessary to synchronize the rotational speed of the input shaft 210 to the speed that the input shaft will be at when the next gear is engaged. The synchronizing mechanism, such as a mechanical synchronizer (not shown), enables such synchronization as is well known in the art. A mechanical synchronizer reduces the relative speed between input shaft 210 and output shaft 212 to enable smooth engagement of the gear set. For example, during an upshift, the mechanical synchronizer utilizes frictional forces to decrease the rate of rotation of input shaft 210 so that the speed of the input shaft 210 will allow the next gear to be engaged smoothly. Conversely, during a downshift, the mechanical synchronizer utilizes frictional forces to increase the rate of rotation of the input shaft 210 so that the speed of the input shaft 210 will allow the next gear to be engaged smoothly.

The powertrain system 200 includes a transmission controller 220, such as an electronic control unit. Transmission controller 220 enables electronic control of transmission 206 to enable the transmission 206 to be configured as a manual-style transmission, but to be operated from a driver's perspective as either an automatic or manual transmission. To effect such operation, transmission 206 has a trio of motors 222, 224, and 226 which operate the clutch and control the shifting of gears in the manual-style transmission 206. Motors 224 and 226 cause movement within transmission 206 similar to movements caused by manipulating a stick shift in a conventional, manual transmission. Motor 224 causes movement of the gears within transmission 206 similar to movement caused by moving a stick shift side to side in a standard H configuration. Motor 226 causes movement of the gears within transmission 206 similar to movement caused by moving a stick shift forward and backward in a standard H configuration. Motor 222 and an associated clutch actuator device, such as shown in FIGS. 1 and 2, replaces manual operation of clutch 204 as in a conventional manual transmission.

In order to generate such control signals, transmission controller 220 receives input signals from engine 202 or engine controller 228 or from external switches. Examples of such information received from an engine 202 or engine controller 228 include vehicle speed, RPM, and the like. Transmission controller 220 also receives input signals from transmission 206, including input shaft speed, output shaft speed and positional information for motors 222, 224, and 226. Transmission controller 220 generates output signals to control motors 222, 224, and 226 and also outputs diagnostic and other communication signals to engine 202 and/or engine controller 228. Transmission controller 220 may also receive other vehicle condition signals, depending on the particular configuration of the powertrain system 200. Transmission controller 220 also receives input from shifter 230. Shifter 230 is configured similar to a typical automatic transmission shift lever. Shifter 230 enables selection of park, reverse, neutral, drive, low gears (optional), and overdrive. Each gear position of the gear shift may have an indicator setting, such as P, R, N, D, O, and L, respectively.

With reference to motors 222, 224, and 226, these motors are preferably rotary motors which cause linear movement to effect engagement and disengagement of clutch 204 through clutch motor 222, or cause shifting of gears through motors 224 and 226. Motors 224 and 226 combine to replace mechanical linkages associated with a shift lever in a conventional manual transmission, assuming a standard H configuration, motor 224 may operate as the crossover motor that selects a gear pack for shifting, as occurs when moving a shifter side to side between legs of the H. Similarly, motor 226 operates as a select motor which engages gears of the selected gear pack as occurs with back and forth movement of a shifter within a leg of the H. The motors 222, 224, and 226 receive control signals from transmission controller 220 to effect shifting gears of transmission 206.

The control of the clutch 204 is accomplished under two types of closed-loop control. The first type is closed-loop positional control whereby the parameter being controlled is the actual clutch position along the continuum of points that mark its range from fully engaged to fully disengaged. Under this type of control, experimental mapping which defines the amount of torque transmitted by the clutch 204, knowing the engine speed and load, is employed to place the clutch 204 at a physical position that is known to be associated with a certain level of clutch slip which is in turn associated with a certain level of transmitted torque. The second type is closed-loop rate-of-slip control whereby the parameter being controlled is the rate at which the amount of clutch slip is increasing or decreasing. Under this type of control, experimental mapping which defines the amount of torque transmitted by the clutch, knowing engine speed and load, and vehicle speed and load, is employed to position the clutch in such a manner that the rate-of-slip of the clutch is manipulated in a manner that provides pleasing levels of driveline smoothness during all clutch maneuvers.

This scheme involves determining the rate of clutch slip by measuring the rotational speed of the engine output shaft 218 via a sensor 230 and the rotational speed of the transmission input shaft 210 via a sensor 232. The rate of clutch slip is then determined by taking the difference of the shaft rotation speed measurements between the two shafts at timed intervals and thereby determining a rate of clutch slip. Prior art systems, such as disclosed in U.S. Pat. No. 5,322,150, have employed closed-loop PID control for maintaining a differential speed of the clutch established by a desired slip amount. However, the system of the present invention utilizes a "rate of clutch slip" (such as RPM per second) which has been found to be a more accurate control criteria than the use of clutch slip as utilized in U.S. Pat. No. 5,322,150.

This rate-of-slip calculational scheme may be considered as based upon the slope of a trace of clutch slip, previously defined, versus time whereby a positive slip would designate increasing overall clutch slip and a negative slope would designate decreasing overall clutch slip. The desired rate of clutch slip versus time, determined empirically from vehicle drivability testing, can then be represented as a value of the slope of the clutch slip versus time trace. That is to say, for each sampling of the clutch slip by the clutch controller, a calculated change in the clutch slip from the previously sampled value is compared to the actual slip rate and this clutch slip rate delta rpm forms a proportional error signal to the PID controller. If the error signal is compared with itself over time, the resulting difference forms a derivative error signal to the PID controller. Since the primary goal of the clutch slip control software engine is to engage or disengage the clutch in a manner that mimics a conventional automatic transmission, this rate of clutch slip calculational scheme is implemented such that the modulation of transmitted driveline torque via the engine/transmission clutch coupling will produce similar vehicle response and therefore similar human physical sensation.

An additional benefit of this rate of clutch slip calculational scheme is that, since it is a rate, it is inherently proportional to the desired dynamic response of the clutch slip control system. For example, a short clutch re-engagement time is required for a relatively small amount of clutch slip while a large amount of clutch slip will require a longer time to re-engage the clutch so as to not input objectionable torque transients into the driveline. Because the dynamic range of clutch slip can be quite high, calibratable gains for the PID controller which are unique to each clutch maneuver (upshift, downshift, kickdown, launch, etc.) are provided. Other methodologies not part of this rate-of-slip scheme, such as pre-positioning, are employed to assist in clutch slip control and to relieve the PID control from having to cope with the total spectrum of possible clutch slip.

It is important to understand, within the scope of this application, that the desired method of clutch control falls into two categories: positional control and rate-of-slip control. It is also important to understand that both are closed-loop, PID-type control; one being controlled closed-loop around a rate-of-slip calibration parameter, and one being controlled close-loop around an absolute numerical value of clutch position which is within the range of the clutch position feedback potentiometer 148. While the rate-of-slip closed-loop control has been previously described, the positional closed-loop scheme is now described below.

A "touch point" adaptive learning scheme is used when the clutch is not in use to determine the absolute position where the clutch begins to transmit significant torque. Because the touch point can vary with changes in clutch wear, temperature, and other linkage variations, the adaptive learning scheme ensures that the clutch system dynamically responds to changing clutch component characteristics and ensures consistent levels of vehicle drivability over the life of the system. Clutch positioning is accomplished using a plurality of calibratable offsets from the adaptively learned touch point, each offset corresponding to different stages of the clutch operation. Pre-positioning of the clutch position prior to usage is employed by analysis of the current touch point position plus the calibrational offset for different operating modes. In other words, the clutch is prepositioned or moved to preferred predetermined positions between or during clutch operations which are set as predetermined offsets from the touch point. This minimizes the time of response for intended clutch action by reducing the range of motion for the expected subsequent clutch action.

An additional benefit of this pre-positioning scheme includes the ability of the clutch control system to maintain consistent levels of vehicle drivability over the life of the system because each pre-positional value "floats" with the adaptively-learned "touchpoint". In this manner, a single calibration value, defining an absolute position relative to the current "touchpoint" value, is employed to position the clutch such that it may transmit the desired level of driveline torque at any moment of a clutch maneuver which is under the closed-loop, positional control authority. Were this scheme not employed, either every positional constant would require adaptive learning, or much less precise control of the clutch would result while under positional-type control. Another benefit of pre-positioning is that, frequently, control of the clutch is handed-off from the positional scheme to the rate-of-slip scheme and vice versa and thus, the pre-positioning scheme allows for the rate-of-slip scheme to initiate with the clutch already positioned such that the rate-of-slip at the outset of slip control is approximately correct. In this manner, large corrections of the PID slip controller are not brought to bear. Whereas other prior art systems, such ask disclosed in U.S. Pat. No. 5,322,150, utilize a pre-mapped positional signal additively superimposed on top of the primary slip goal signal, the proposed invention bases its positional input, not from a statically stored clutch-characteristic map, but from a dynamic, adaptively-learned "touchpoint" calibration value.

Figure 13:
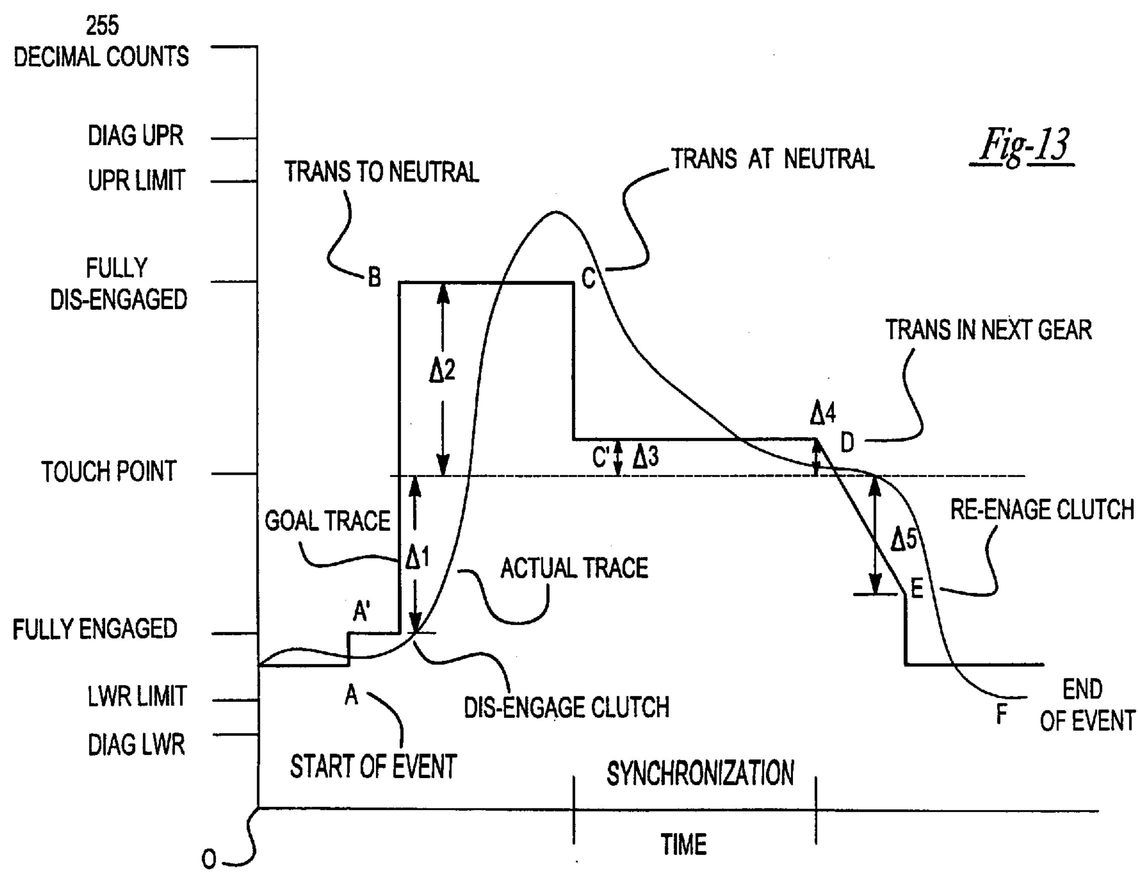
FIG. 13 is a diagram of the clutch position during a shift operation according to the principles of the present invention.

FIG. 13 provides a diagram which is representative of either an upshift or downshift clutch action. While the transmission 206 is in a driving condition, the clutch 204 is in an engaged position representative of position A in FIG. 13. At the initial signalling of an imminent shift event, the clutch actuator motor 222 pre-positions the clutch 204 at a position above the lower limit of travel (lower limit) but below the fully engaged position A'. After the pre-positioning motion is complete and with an actual shift request from the controller, the clutch actuator positions the clutch at, or slightly above, the fully disengaged point to allow the transmission to be shifted from in-gear to a neutral position "B." It should be noted that in the diagram of FIG. 13, the goal trace of the clutch positioning is shown in solid lines as a step-like configuration, while, due to the fact that the clutch position is mapped against time, the actual trace of the clutch movement as shown in dashed lines cannot feasibly follow the goal trace due to mechanical inertia. As the clutch actuator's motion must be accomplished (unloading the driveline) before the shift to neutral, the speed at which the actuator is moved is driven by a pulse width modulated (PWM) signal near the maximum value, resulting in some overshoot of the intended "goal" position (B-C). To minimize the actuator's mechanical overshoot would lengthen the clutch response time from moving between the engaged to the disengaged position. Since as rapid of a response time as possible is desirable, the overshoot is preferred as compared to slowing down the response time for moving the clutch from the engaged to the disengaged positions.

As the transmission reaches the neutral position C, the actuator pre-positions the clutch to be ready for the re-engagement motion by moving the clutch to position C'. This pre-positioning motion places the clutch just above the touchpoint and affects system response in two ways—minimized time response for the subsequent re-engage and seamless transition between the two control schemes, positional and rate-of-slip. This pre-positioning is taking place while the transmission is in the synchronization process and, therefore, the PWM signal is less than maximum. Since the synchronization process consumes the bulk of the total shift time, this pre-positioning motion from the neutral position C to the pre-positioned position D depicts a slower positioning response rate than for the initial clutch disengagement motion.

As the transmission achieves synchronization (generally at D), the clutch actuator reapplies the clutch to a rate of slip control parameter (D-E). As discussed above, the closed-loop, PID, "rate of clutch slip" calculational scheme controls the rate of clutch engagement to a predetermined numeric rate of clutch slip based upon a rate of clutch slip MAP which is experimentally determined for desired levels of drivability. It has been found that for certain transmission systems, the rate of clutch slip value is approximately constant for a majority of the operating range of the powertrain system. Thus, a MAP per se is not required if it is determined that the powertrain system has a relatively constant rate of clutch slip which provides the desired levels of drivability.

Once the clutch position passes the "fully engaged" point E, the actuator is moved at a maximum rate to the lower limit stop (E-F).

Since the electro-mechanical clutch actuator 10, according to the principles of the present invention, has a self-locking drive clutch 100 which prevents coast back against the force of the clutch spring, the PWM signal is set to zero percent when the actuator position is within the hysterisis deadband around the required goal position. This ability to turn off the clutch motor drive electronics aids in the thermal management of the actuator and allows downsizing of the actuator drive electronics.

Since the electro-mechanical clutch actuator 10 has an over-running ball clutch which prevents the actuator from experiencing a "hard" stop at the mechanical limits of travel, no high current "stall torque" draw from the DC motor is encountered. Thus, it is not necessary to take special precautions in the clutch drive software to prevent such a "hard" stop by use of back drive pulses or drive-shunt-drive motor motion control.

The clutch actuator position feedback potentiometer 148 allows pre-positioning of the clutch actuator 10 prior to start of its next intended motion and thus, minimizes time spent waiting for the dependent system to respond as determined by evaluation of closed-loop feedback system parameters. Software schemes evaluate these parameters and decide which is the next most likely clutch maneuver and pre-positions the clutch accordingly.

The clutch actuator position feedback potentiometer facilitates adaptive learning of the clutch start-to-engage position or touch point. Accordingly, the actuator can periodically be brought to this touch point when clutch motion is not required and, by using the response of the dependent system (engine RPM), the new touch point position may be relearned and stored away in RAM. This allows the relative clutch positioning calibration system to be employed whereby all clutch positioning is carried out by predetermined offsets relative to the learned touch point which is dynamically changing over time due to clutch component wear and temperature variations.

As discussed above, the algorithm for controlling the clutch actuator utilizes a plurality of clutch positioning offsets from the touch point during a transmission up-shifting operation. A first offset $\Delta_1$ is representative of the pre-positioning position A' wherein the clutch position is adjusted in anticipation of a shift event. A second offset $\Delta_2$ from the touch point is provided for the initial clutch disengagement motion to position B. A third clutch offset $\Delta_3$ is provided from the touch point while the clutch position is moved to C' while the system is waiting for synchronization. The clutch is then moved to a fourth offset from touch point $\Delta_4$ representative of position D prior to the calculated rate-of-slip control initiation. During the closed-loop PID rate of clutch slip clutch engagement scheme, as the clutch position reaches a fifth offset $\Delta_5$ from the touch point, a ballistic clutch drop is performed where the slip control scheme is halted and the clutch is driven to the fully engaged position F. For a down-shifting operation, the offsets $\Delta_1$, $\Delta_2$, and $\Delta_5$ are generally the same as for an upshift operation. However, offsets $\Delta$3 and $\Delta$4 are typically different for downshift operations in order to provide the desired drivability.

A sixth offset $\Delta_6$ from the touch point is provided for throttle open down shifts (kick downs). This type of downshift typically occurs when the vehicle comes under increasing load, such as climbing a hill, and the throttle is moved to a more open position. Since the required downshift is requested while the throttle is open or opening, this offset $\Delta_6$ is required to be different than for a normal downshift which normally occur under closing or closed throttle in consideration of desired levels of drivability.

A seventh offset $\Delta_7$ from touch point is provided to engage the gear box from a resting neutral position. An eighth offset $\Delta_8$ from the touch point is provided for a clutch with the gear box in first gear awaiting launch. A ninth offset $\Delta_9$ from touch point is provided to engage reverse. The seventh offset is provided to disengage the clutch sufficiently from its resting position that the input shaft speed is sufficiently low that the gearbox may engage one of the drive gears without mechanical shock or noise. This offset is typically required when the drive selector is moved form the park to drive or reverse settings. In either case of offsets eight or nine, as soon as the throttle is depressed, a throttle opening angle versus clutch position MAP is employed to position the clutch such that the vehicle begins to move in proportion to throttle opening until a vehicle speed threshold is reached, whereupon the control strategy abandons the proportional/positional scheme, and enables the rate-of-slip calculational scheme to affect the launch of the vehicle in either forward or reverse. Prior to this application of throttle, the offsets $\Delta_8$ and $\Delta_9$ position the clutch such that, even with closed throttle, the car begins to move at a very slow speed such as is evident with standard automatic transmission "creep" while in-gear. In this manner, the electronically controlled manual-type transmission provides a similar driving feel to a standard automatic transmission which employs a torque convertor.

A significant portion of clutch control according to the present application is accomplished via ballistic, closed-loop positional control. Examples of this type of clutch motion include disengagement of the clutch to engage first or reverse gear from resting neutral; lowering the clutch, in anticipation of launch, upon completion of shifting from neutral to first or reverse and thereby providing automatic transmission-type "creep"; and modulating the clutch position versus throttle angle for "parking lot or garage-type" maneuvers. For these closed-loop positional maneuvers, calibration trims to the position offsets based upon RPM, vehicle speed, throttle angle, engine coolant temperature, MAP value, brake pedal position, and others are employed. These trims are not used in the closed-loop, PID, control to a "rate of clutch slip" function, except as initiation-of-scheme enablers.

An alternative to the closed-loop rate of clutch slip control is the substitution of a "rate of torque applied" calculational scheme instead of the rate of clutch slip calculational scheme. According to this embodiment, a torque sensing element is applied to the transmission input shaft 210. An example torque sensing element is available from Transense Technologies, P.L.C. According to this embodiment, instead of a closed-loop PID control to a rate of slip, control to a rate of torque applied to the driveline goal is utilized. Thus, a rate of torque applied to the driveline map is experimentally determined for desired levels of drivability.

In this manner, the actual vehicle operating parameter responsible for accurately determining the required levels of clutch engage/disengage smoothness can be recorded and stored as a mapping of clutch position versus transmitted engine torque through the driveline. This mapping then, recorded under all vehicle operating points of interest, forms the basis for the generation of a rate-of-applied-torque to the driveline control or goal signal. The closed-loop PID controller previously described would function in a similar manner as before except the parameter being controlled would be rate-of-application of driveline torque through the control of the transmitting mechanism, the vehicle clutch. That is to say, the clutch position would be modulated as before, but the feedback parameter forming the closed-loop error input signal to the PID controller would be the actual measured transmission input-shaft torque.

Figure 14A:
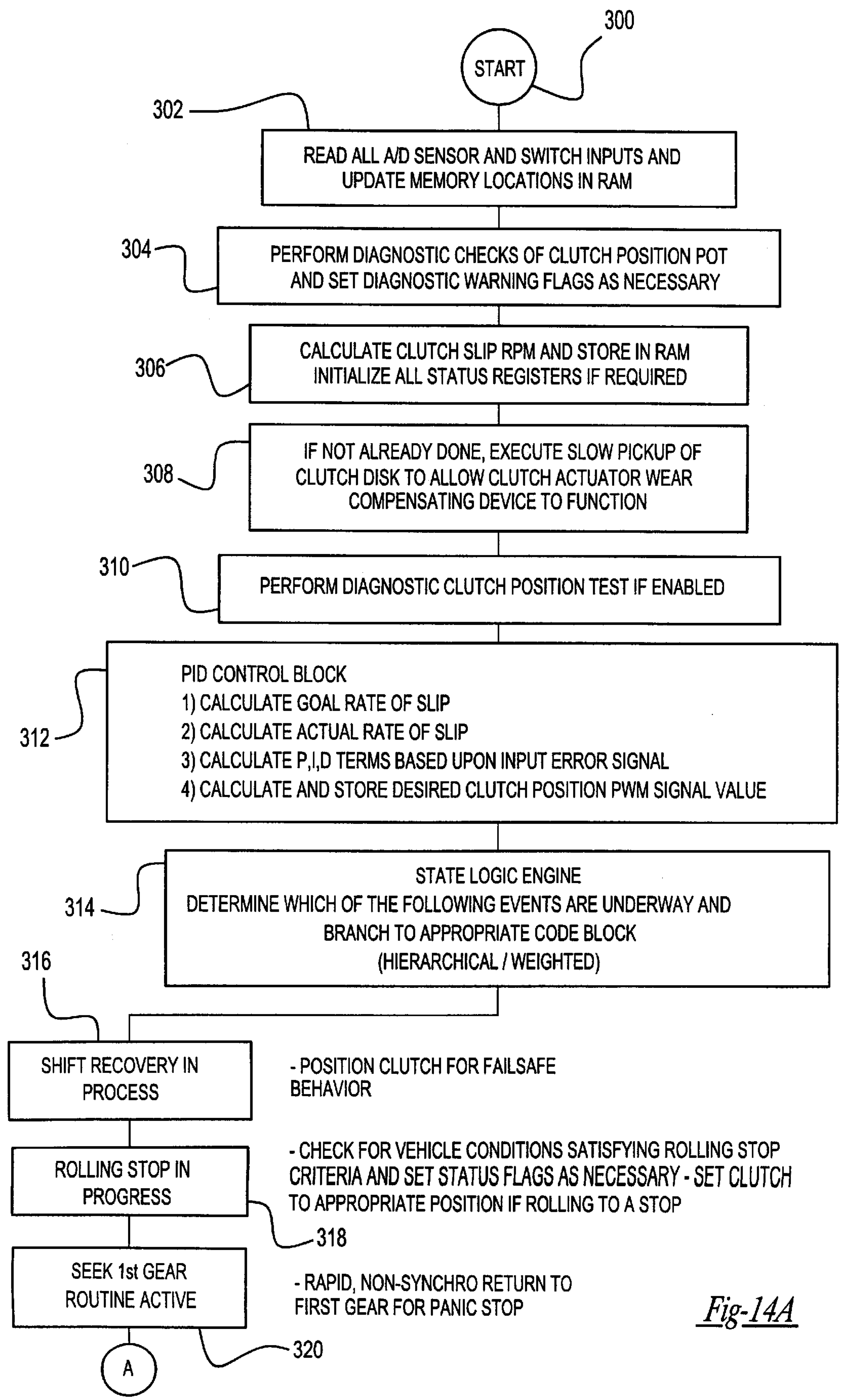
FIGS. 14A and 14B illustrate a flowchart for a clutch control strategy according to the principles of the present invention.
Figure 14B:
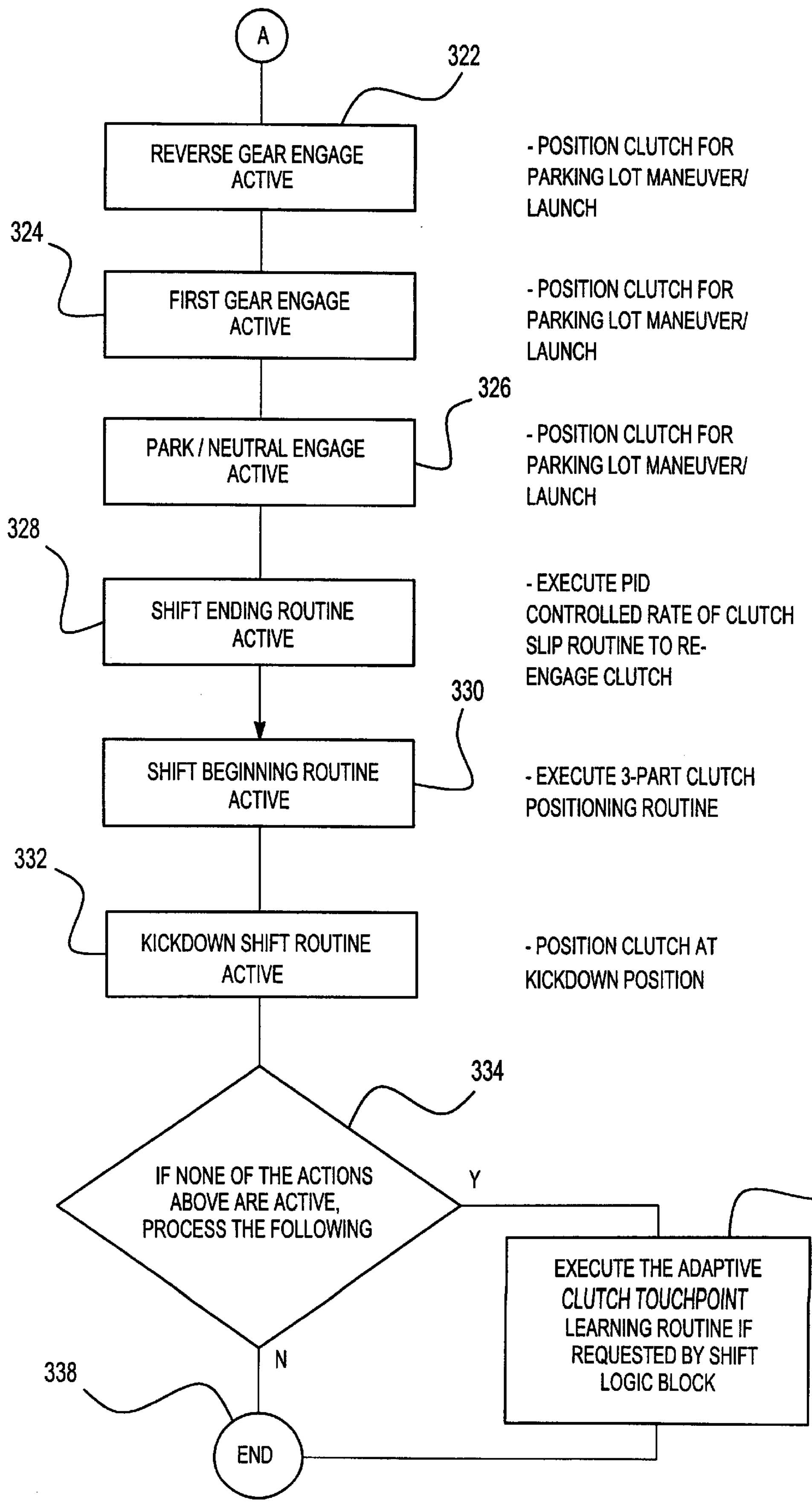

Referring to FIGS. 14A and 14B, a method, according to the present invention, for controlling the clutch assembly 204 is illustrated. The methodology begins in bubble 300 and advances to block 302. In block 302, the methodology reads all analog to digital sensor inputs, performs necessary calculations, and stores the values in the memory of engine controller 228 or transmission controller 220. The methodology then advances to block 304 where diagnostic checks on the clutch actuator feedback potentiometer are performed and the setting or clearing of diagnostic status indicator flags are performed. The methodology then advances to block 306 and calculates clutch slip RPM and stores this value in the memory of the engine controller 228 or transmission controller 220 and initializes registers in the transmission controller 220. The methodology then advances to block 308, and if not already done, executes a slow speed pickup of the clutch disk of the clutch assembly 204 to allow a wear compensating device (not shown) to function. The methodology advances to block 310 and performs a diagnostic clutch position test if enabled. The methodology advances to block 312, which is the proportional, integral, derivative (PID) control module which calculates the rate-of-slip goal, calculates the actual rate-of-slip, calculates the P, I, and D component signal values based upon the input error signal, and calculates and stores the desired clutch pulsewidth-modulated (PWM) positioning signal value. The methodology then advances to block 314 and determines which of the subsequent events are underway and branches to the appropriate code block, based upon a weighted, hierarchial prioritizing scheme.

After block 314, the methodology advances to block 316 and determines if a recovery of a failed shift attempt is in process, for example, by looking for a flag. If so, the methodology positions the clutch assembly 204 for failsafe behavior according to a predetermined criteria. If not, the methodology advances to block 318 and checks for vehicle conditions satisfying rolling stop criteria and sets status flags as necessary and sets the clutch assembly 204 to an appropriate position if rolling to an imminent stop. The methodology then advances to block 320 and performs a rapid, non-synchronized return to first gear if a panic stop or impending drive wheel lockup during stop is occurring.

If not, the methodology advances to block 322 and determines if reverse gear engagement is active, for example, by looking for a flag. If so, the methodology positions the clutch assembly 204 for parking lot maneuver/launch according to predetermined criteria. If not, the methodology advances to block 324 and determines if the first gear engage routine is active, and if so, positions the clutch assembly 204 for a parking lot maneuver/launch according to predetermined criteria. If not, the methodology advances to block 326 and determines if a park/neutral routine is active, for example, by looking for a flag. If so, the methodology positions the clutch assembly 204 for parking lot maneuver/launch according to predetermined criteria. If not, the methodology advances to block 328 and determines if the shift ending routine is active, for example, by looking for a flag. If so, the methodology executes a PID controlled rate of clutch slip routine to re-engage the clutch assembly 204. If not, the methodology advances to block 330 and determines if a shift beginning routine is active, for example, by looking for a flag. If so, the methodology executes a three-part clutch positioning routine for the clutch assembly 204. If not, the methodology advances to block 332 and determines if a kickdown routine is active, for example, by looking for a flag. If so, the methodology positions the clutch assembly 204 at the kickdown position according to predetermined criteria. If not, the methodology advances to block 334 and concludes that none of the above blocks 316 through 332 are active. If not, the methodology then advances to block 336 and executes an adaptive clutch touchpoint learning/routine if requested by the shift logic controller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for controlling engagement of a clutch using a clutch actuator, comprising the steps of:

applying a torque sensing element to a transmission input shaft;

providing a pre-determined rate of torque applied goal for engagement of said clutch;

initiating clutch engagement;

detecting a rate of torque applied during engagement of said clutch by measuring torque at timed intervals and determining a difference in torque divided by an amount of time corresponding to said timed intervals; and adjusting a position of said clutch in order to bring said clutch into engagement according to said predetermined rate of torque applied goal.

* * * * *